United States Patent
Sauler et al.

(10) Patent No.: US 6,814,054 B2
(45) Date of Patent: Nov. 9, 2004

(54) METHOD FOR OPERATING AN INTERNAL COMBUSTION ENGINE, AND A CORRESPONDING DEVICE

(75) Inventors: Jürgen Sauler, Stuttgart (DE); Oskar Torno, Schwieberdingen (DE); Axel Heinstein, Wimsheim (DE); Carsten Kluth, Stuttgart (DE); Werner Haeming, Neudenau (DE)

(73) Assignee: Robert Bosch GmbH, Stuttgart (DE)

( * ) Notice: Subject to any disclaimer, the term of this patent is extended or adjusted under 35 U.S.C. 154(b) by 175 days.

(21) Appl. No.: 10/129,478

(22) PCT Filed: Aug. 2, 2001

(86) PCT No.: PCT/DE01/02941

§ 371 (c)(1),
(2), (4) Date: Jul. 17, 2002

(87) PCT Pub. No.: WO02/20964

PCT Pub. Date: Mar. 14, 2002

(65) Prior Publication Data

US 2003/0136378 A1 Jul. 24, 2003

(30) Foreign Application Priority Data

Sep. 4, 2000 (DE) ........................................ 100 43 693

(51) Int. Cl.⁷ ................................................. F02P 5/00
(52) U.S. Cl. ........................... 123/406.21; 123/406.24; 123/406.45; 123/568.11
(58) Field of Search ....................... 123/406.21–406.29, 123/406.37, 406.38, 406.39, 406.45, 406.47, 406.48, 568.11, 568.28, 399, 90

(56) References Cited

U.S. PATENT DOCUMENTS

| | | | |
|---|---|---|---|
| 4,622,939 A | * 11/1986 | Matekunas | ............. 123/406.41 |
| 4,846,130 A | 7/1989 | Jensen | |
| 5,168,853 A | * 12/1992 | Kittelson et al. | ...... 123/406.23 |
| 5,929,322 A | * 7/1999 | Aoki et al. | ................. 73/35.08 |
| 5,988,137 A | * 11/1999 | Tamura et al. | .............. 123/295 |
| 5,992,372 A | * 11/1999 | Nakajima | ................... 123/295 |
| 6,041,756 A | 3/2000 | Bonne | |

FOREIGN PATENT DOCUMENTS

| | | |
|---|---|---|
| GB | 2055961 | 3/1981 |
| JP | 58 028531 | 2/1983 |
| JP | 61 169641 | 7/1986 |
| JP | 61 190119 | 8/1986 |
| JP | 63 012861 | 1/1988 |
| JP | 11 190236 | 7/1999 |

* cited by examiner

*Primary Examiner*—John T. Kwon
(74) *Attorney, Agent, or Firm*—Kenyon & Kenyon

(57) ABSTRACT

A method for operating an internal combustion engine and a corresponding device are described in which a combustion of a fuel in a fuel-air mixture introduced into a cylinder occurs in at least one cylinder. At least one adjusting device is used to influence at least one physical process, which modifies the distribution of the constituents and/or the overall composition of the fuel-air mixture in the at least one cylinder. If knock occurs, a knock control is used to gradually retard an ignition angle in the at least one cylinder from a fundamental ignition angle by an adjustment angle. When the adjustment of the at least one adjusting device exceeds a specifiable first threshold and/or the change in the at least one physical process exceeds a specifiable second threshold, the adjustment angle is rapidly reduced by increments, the more rapid reduction occurring with a larger increment and/or with a higher frequency of increments.

11 Claims, No Drawings

METHOD FOR OPERATING AN INTERNAL COMBUSTION ENGINE, AND A CORRESPONDING DEVICE

FIELD OF THE INVENTION

The present invention relates to a method for operating an internal combustion engine and a corresponding device.

BACKGROUND INFORMATION

A method for operating an internal combustion engine and a corresponding device is already conventional, in which combustion of a fuel in a fuel-air mixture introduced into the cylinder occurs in at least one cylinder. Moreover, adjusting devices, for example, an exhaust gas recirculation valve, a camshaft adjustment for the intake and/or the exhaust, variable valve timing or a charge movement valve are conventional, which influence the physical processes such as the exhaust gas recirculation rate, the intensity of movement of the fuel-air mixture, the volume of the fresh air supplied or the volume of the fuel-air mixture supplied, these physical processes modifying the distribution of the components and/or the total composition of the fuel-air mixture in the cylinder.

Furthermore, knock detection and knock control systems are conventional for internal combustion engines so if knock is detected in a cylinder, the ignition angle is retarded after the occurrence of a knock signal.

When the rate of the recirculated exhaust gas is increased, the base ignition angle is advanced by a fixed, specified angle in conventional internal combustion engines.

SUMMARY OF THE INVENTION

The method and device according to the present invention may provide the advantage that the internal combustion engine may be operated at the knock limit in dynamic operating states so that maximum efficiency is attained.

It may be advantageous to be able to bring the internal combustion engine rapidly to the knock limit when there is a change in the exhaust gas recirculation rate. This also applies to a change in the position of the charge movement valve or to a change in the air supply or the fuel-air mixture supply related to the camshaft adjustment or variable valve adjustment. An additional acceleration of the advance to the knock limit is attained if an advanced adjustment angle is added to the basic ignition angle. It may be further advantageous to reduce the adjustment angle for all cylinders simultaneously since it is thus possible to make the adaptation to the new conditions for all cylinders immediately. In certain cases when the individual characteristics of the individual cylinders are very different, it may be advantageous to reduce the adjustment angle rapidly cylinder-by-cylinder. It may be further advantageous to transmit the reference value rapidly when the adjustment angle is rapidly reduced since the knock detection should also be rapidly adapted to the new conditions. If knock or load dynamic occurs, it is then advisable to interrupt the rapid reduction to avoid knock.

DETAILED DESCRIPTION

Knock, i.e., an abnormal combustion event in the combustion chamber of an internal combustion engine, limits power and efficiency and results in damage to the combustion chamber due to the high flange speeds. In order to prevent this, conventional systems for knock detection and knock control are integrated in modern internal combustion engines. Such systems are referred to in the literature; for that reason, their function will only be summarized briefly in the following.

Using the knock sensors which are a part of the knock detection, signals from the combustion chamber are detected which are passed on to an evaluation unit which is also part of the knock detection. Such signals may be, for example, acoustic signals, electromagnetic signals, electrical signals, pressure signals or temperature signals which are recorded by the knock sensors within or outside of the combustion chamber. The evaluation unit amplifies the signals and integrates the signals in a suitable manner so that after an analog/digital conversion of the signals, the integrated value $U_{INT,current}$ may be compared with a threshold in a microprocessor contained in the internal combustion engine, a knock is detected if the threshold is exceeded. Moreover, a selection of, for example, a specific frequency band or a selection in relation to a specific time window may be made in the evaluation unit to suppress interfering signals, the frequency band or the time window is characteristic of the occurrence of knock signals.

In an example embodiment for knock detection, the present digitized knock signal $U_{INT,current}$ is compared with a reference value $U_{REF,old}$ of the cylinder presently involved by the microprocessor. The comparison contains the determination of a relative knock intensity RKI which results as a quotient of the present knock signal and the cylinder-specific reference value:

$$RKI = \frac{U_{INT,current}}{U_{REF,old}}.$$

The relative knock intensity RKI is then compared with a knock detection threshold. In this example embodiment as well, the knock detection threshold is in turn supplied by the microprocessor. In an example embodiment, a cylinder-specific knock detection threshold is supplied for the present cylinder.

The cylinder-specific reference value $U_{REF,old}$, which is required to calculate the relative knock intensity RKI, is continuously adapted to the current operating state of the internal combustion engine. This occurs with the aid of a tracking factor N with the aid of which a new cylinder-specific reference value $U_{REF,new}$ is calculated, in which the present knock signal $U_{INT,current}$ is taken into account. The new cylinder-specific reference value $U_{REF,new}$ is calculated by using the following equation:

$$U_{REF,new} = \frac{N-1}{N} \times U_{REF,old} + \frac{1}{N} \times U_{INT,current}.$$

If a knock has been detected, then the microprocessor integrated in the internal combustion engine performs the knock control to the effect that an adjustment angle is added to a fundamental ignition angle, the total forming the base ignition angle. The base ignition angle is further retarded, the larger the adjustment angle. For the purposes of this application, the adjustment angle is defined as a positive value. The retardation of the base ignition angle brings about a reduction of the knock. If a knock occurs again, the base ignition angle is again retarded by increasing the adjustment angle. A torque-based ignition angle is also calculated from the torque structure based on the torque requirements, the torque-based ignition angle representing the most advanced ignition angle possible. The base ignition angle and the torque-based ignition angle are subsequently compared in the method to calculate the ignition angle, the more retarded of the two ignition angles is used as the ignition angle to be implemented. The base ignition angle is read from a load-based and/or speed-based characteristics map which contains the ignition angle under standard conditions and is stored in the microprocessor of the internal combustion engine. It contains values for the fundamental ignition angle which are assigned to specific ranges of speed and/or load. The speed is determined by sensors that are mounted on the crankshaft. The load, i.e., the relative air charge of the relevant cylinder, is determined by the microprocessor based on various operating parameters such as speed, torque requirement and based on the measured values of the hot-film air mass meter (HFM) and the intake manifold pressure sensor, the rate of the recirculated exhaust gas or the position of the throttle valve is determined with the aid of models and supplied for the determination of the base ignition angle. The relative air charge is defined as the ratio of the present air charge and the air charge under standard conditions for the relevant cylinder. The ignition angle is adjusted by the knock control until knock no longer occurs. The adjustment of the ignition angle in the individual increments is added up to an adjustment angle which indicates the total adjustment of the base ignition angle based on the fundamental ignition angle. If knock no longer occurs for a specific period of time, then the knock control advances the base ignition angle again. The adjustment angle is reduced accordingly.

Exhaust gas recirculation includes the recirculation of exhaust gas for recombustion in the combustion chamber. It may be performed in both an internal combustion engine with gasoline direct injection and in an engine with multi-point injection. Exhaust gas recirculation includes both internal and external exhaust gas recirculation, internal exhaust gas recirculation describing the event in which the exhaust gas in the cylinder is not completely ejected, but rather exhaust gas stays in the cylinder which is again a component of the fuel-air mixture in the cylinder in the next operating cycle. External exhaust gas recirculation includes the recirculation of exhaust gas from the exhaust train into the intake manifold of the internal combustion engine. The rate of the externally recirculated exhaust gas is influenced by the exhaust gas recirculation valve which is in turn controlled by the microprocessor. The rate of the internally recirculated exhaust gas may be influenced by the intake camshaft position and exhaust camshaft position or by the variable valve adjustment in doing so, the position of the crank angle is modified by the position of the camshaft at which the valves are open, and since the crank angle range at which the valves are open is not modified, a change in the position of the camshaft also brings about a change in the crank angle at which the valves close. In an example embodiment, it may be possible to change the camshaft adjustment of all valves of one cylinder and in another example embodiment, it may be possible to change the camshaft adjustment of the intake valves and the exhaust valves separately. The variable valve adjustment makes it possible to open and close each individual valve at any position. When the rate of the recirculated exhaust gas is increased, the oxygen content of the fuel-air mixture in the cylinder is reduced so that the occurrence of abnormal combustion events in the combustion chamber is impeded and the peak combustion temperature is lowered.

In an internal combustion engine, the position of the charge movement valve makes it possible to control the intensity of the charge movement. In the area of the intake valve, the intake manifold includes two channels having different geometric shapes. The charge movement valve is the actuating element in one of the channels in order to distribute the flow of air differently to the two channels and thus adjust the movement of the charge. One channel is shaped in such a manner that the air when flowing through is forced to move perpendicular to the main direction of flow; the other channel is shaped to be as favorable to flow as possible to keep flow resistance low. Constriction of the intake channel by the charge movement valve produces a high charge movement.

When the increase in the rate of the recirculated exhaust gas exceeds a specifiable and applicable rate change threshold, according to the present invention, the rapid advance is activated at which the adjustment angle is quickly reduced. The rapid reduction of the adjustment angle is attained by reducing the adjustment angle in large increments and/or at a high frequency. The reduction thus occurs more rapidly than in the above-described reduction of the adjustment angle if no knock occurs for extended periods of time. The result of the rapid reduction is that the engine is quickly operated at the knock limit which was changed with a change in the exhaust gas recirculation rate. A high degree of efficiency may be attained in this manner.

In the event of knock or the presence of a load or speed dynamic, the rapid reduction of the adjustment angle is deactivated again and the knock control is continued normally by enlarging the adjustment angle in the event of knock or, if no knock has occurred after a specific time, the adjustment angle is reduced again. The microprocessor detects a load dynamic and a speed dynamic when the load change exceeds a load threshold or a speed threshold.

The rapid reduction or the normal knock control is controlled by the microprocessor. The microprocessor also controls the adjusting elements such as the exhaust gas recirculation valve, the camshaft adjustment, the variable valve adjustment and the charge movement valve. All the thresholds mentioned in connection with the present invention are also stored in the microprocessor.

By analogy, a change in the exhaust gas recirculation rate is also attained when the exhaust gas recirculation valve adjustment, the camshaft adjustment, i.e., the intake and exhaust camshaft adjustment, is changed or the variable valve adjustment is changed. In this connection, the adjustment of the exhaust gas recirculation valve affects the external rate of the recirculated exhaust gas and the camshaft adjustment and the variable valve adjustment affects the internal rate of the recirculated exhaust gas. If the adjustment exceeds a specifiable, applicable threshold (the exhaust gas recirculation valve change threshold, the intake/exhaust camshaft change threshold or the first valve change threshold), the adjustment angle is rapidly reduced as described above.

In a further example embodiment of the present invention, even if the intensity of the movement of the fuel-air mixture is strongly changed by the strong change in position of the charge movement valve, the adjustment angle is rapidly reduced as described above. The strong change in the position of the charge movement valve is measured by exceeding the specifiable, applicable charge movement valve change threshold.

In a further example embodiment of the present invention, if there is a strong change in the volume of fresh air supplied or in the volume of the fuel-air mixture, the above-described rapid reduction of the adjustment angle is activated. The change in the volume of fresh air supplied or in the volume of the fuel-air mixture is influenced by the change in the camshaft adjustment, e.g., the intake and/or exhaust camshaft adjustment, or the change in the variable valve adjustment and measured by this change using thresholds (intake/exhaust camshaft change threshold or second valve change threshold).

In a further example embodiment of the present invention, in addition to the rapid reduction of the adjustment angle, an advanced adjustment angle is added to the adjustment angle and the fundamental ignition angle so that the base ignition angle is now formed from the sum of the adjustment angle, fundamental ignition angle and advanced adjustment angle. The advanced adjustment angle is a negative value. A different, specifiable, applicable advanced adjustment angle is provided for each physical process: a first advanced adjustment angle for the change in the exhaust gas recirculation rate, a second advanced adjustment angle for the change in intensity of the movement of the feel-air mixture and a third advanced adjustment angle for the change in the volume of the fresh air supplied and the volume of the fuel-air mixture. The first, second and/or third advanced adjustment angles are stored in the microprocessor.

In additional example embodiments of the present invention, the rapid reduction of the adjustment angle may occur either for all cylinders simultaneously or for individual cylinders. The adjustment for individual cylinders takes into account the individual characteristics of the internal combustion engine cylinders; however, a rapid reduction of the adjustment angle for all cylinders simultaneously may make it possible to advance to the knock limit even more rapidly.

In a further example embodiment, the knock detection is also adapted to the changed circumstances by the change in exhaust gas recirculation rate, the change in the intensity of the movement of the fuel-air mixture and the change in volume of the fresh air supplied and the volume of the fuel-air mixture. This occurs as a result of the reduction of tracking factor N. It is thus possible to adapt cylinder-specific reference value $U_{REF,new}$ quickly to the present conditions.

What is claimed is:

1. A method for operating an internal combustion engine, comprising:
   performing, in at least one cylinder, combustion of a fuel in a fuel-air mixture introduced into the at least one cylinder;
   influencing at least one physical process by at least one adjusting device;
   modifying a distribution of at least one of constituents and an overall composition of the fuel-air mixture in the at least one cylinder by the at least one physical process;
   retarding gradually, when a knock occurs, an ignition angle in the at least one cylinder by a knock control from a fundamental ignition angle by an adjustment angle; and
   reducing rapidly, by increments, the adjustment angle if at least one of an adjustment of the at least one adjusting device exceeds a specifiable first threshold and a change in the at least one physical process exceeds a specifiable second threshold, wherein a more rapid reduction occurs with at least one of a larger increment and a higher frequency of increments.

2. A method for operating an internal combustion engine, comprising:
   performing, in at least one cylinder, combustion of a fuel in a fuel-air mixture introduced into the at least one cylinder;
   influencing at least one physical process by at least one adjusting device;
   modifying a distribution of at least one of constituents and an overall composition of the fuel-air mixture in the at least one cylinder by the at least one physical process;
   retarding gradually, when a knock occurs, an ignition angle in the at least one cylinder by a knock control from a fundamental ignition angle by an adjustment angle; and
   reducing rapidly, by increments, the adjustment angle if at least one of an adjustment of the at least one adjusting device exceeds a specifiable first threshold and a chancre in the at least one physical process exceeds a specifiable second threshold, wherein a more rapid reduction occurs with at least one of a larger increment and a higher frequency of increments;
   wherein the at least one adjusting device includes at least one of at least one exhaust gas recirculation valve, at least one intake adjustment, at least one exhaust camshaft adjustment, and a variable valve adjustment;
   wherein a rate of a recirculated exhaust gas is influenced as the at least one physical process;
   wherein the rapid reduction of the adjustment angle occurs when at least one of the following occurs:
      a change in the rate of the recirculated exhaust gas exceeds a specifiable rate change threshold,
      a change in an exhaust gas recirculation valve adjustment exceeds a specifiable exhaust gas recirculation valve change threshold,
      a change in the at least one intake camshaft adjustment exceeds a specifiable intake camshaft change threshold,
      a change in the at least one exhaust camshaft adjustment exceeds an exhaust camshaft change threshold, and
      a change in the variable valve adjustment exceeds a specifiable first valve change threshold.

3. The method according to claim 2, further comprising:
   adding a first advance adjustment angle to the fundamental ignition angle if at least one of the specifiable rate change threshold, the specifiable exhaust gas recirculation valve change threshold, the specifiable intake camshaft change threshold, the exhaust camshaft change threshold and the first valve change threshold is exceeded.

4. A method for operating an internal combustion engine, comprising:
   performing, in at least one cylinder, combustion of a fuel in a fuel-air mixture introduced into the at least one cylinder;
   influencing at least one physical process by at least one adjusting device;
   modifying a distribution of at least one of constituents and an overall composition of the fuel-air mixture in the at least one cylinder by the at least one physical process;
   retarding gradually when a knock occurs an ignition angle in the at least one cylinder by a knock control from a fundamental ignition angle by an adjustment angle; and
   reducing rapidly, by increments, the adjustment angle if at least one of an adjustment of the at least one adjusting device exceeds a specifiable first threshold and a change in the at least one physical process exceeds a specifiable second threshold, wherein a more rapid reduction occurs with at least one of a larger increment and a higher frequency of increments;

wherein the at least one adjusting device includes at least one charge movement valve;

wherein an intensity of a movement of the fuel-air mixture is influenced as the at least one physical process; and wherein the rapid reduction of the adjustment angle occurs when a change in position of a charge movement valve exceeds a specifiable charge movement valve change threshold.

5. The method according to claim 4, further comprising:

adding a second advance adjustment angle to the fundamental ignition angle when the specifiable charge movement valve change threshold is exceeded.

6. A method for operating an internal combustion engine comprising:

performing, in at least one cylinder, combustion of a fuel in a fuel-air mixture introduced into the at least one cylinder;

influencing at least one physical process by at least one adjusting device;

modifying a distribution of at least one of constituents and an overall composition of the fuel-air mixture in the at least one cylinder by the at least one physical process;

retarding gradually, when a knock occurs, an ignition angle in the at least one cylinder by a knock control from a fundamental ignition angle by an adjustment angle; and reducing rapidly, by increments, the adjustment angle if at least one of an adjustment of the at least one adjusting device exceeds a specifiable first threshold and a chance in the at least one physical process exceeds a specifiable second threshold, wherein a more rapid reduction occurs with at least one of a larger increment and a higher frequency of increments;

wherein the at least one adjusting device includes one of at least one intake camshaft adjustment, at least one exhaust camshaft adjustment, and one variable valve control;

wherein a volume of one of a fresh air supplied and the fuel-air mixture is influenced as the at least one physical process; and wherein the rapid reduction of the adjustment angle occurs when at least one of the following occurs:

at least one of a change in the at least one intake camshaft adjustment exceeds a specifiable intake camshaft change threshold and a change in the at least one exhaust camshaft adjustment exceeds a specifiable exhaust camshaft change threshold, and a change in a variable valve adjustment exceeds a specifiable second valve change threshold.

7. The method according to claim 6, further comprising:

adding a third advance adjustment angle to the fundamental ignition angle if at least one of the specifiable intake camshaft change threshold, the specifiable exhaust camshaft change threshold, and the specifiable second valve change threshold is exceeded.

8. The method according to claim 1, wherein:

the rapid reduction of the adjustment angle occurs for all cylinders simultaneously.

9. The method according to claim 1, wherein:

the rapid reduction of the adjusting angle occurs individually for each cylinder.

10. The method according to claim 1, further comprising:

changing a tracking factor for a calculation of a reference value of a knock detection when the rapid reduction of the adjustment angle is activated.

11. The method according to claim 1, further comprising:

interrupting the rapid reduction of the adjusting angle if at least one of knock occurs, and at least one of a load dynamic and a speed dynamic is present.

* * * * *

UNITED STATES PATENT AND TRADEMARK OFFICE
CERTIFICATE OF CORRECTION

PATENT NO. : 6,814,054 B2
DATED : November 9, 2004
INVENTOR(S) : Jürgen Sauler et al.

It is certified that error appears in the above-identified patent and that said Letters Patent is hereby corrected as shown below:

Column 6,
Lines 12-13, change "and a chan- cre in the" to -- and a change in the --.

Signed and Sealed this

Thirteenth Day of September, 2005

JON W. DUDAS
*Director of the United States Patent and Trademark Office*